United States Patent
Watanabe et al.

(10) Patent No.: US 7,578,864 B2
(45) Date of Patent: Aug. 25, 2009

(54) CERAMIC HONEYCOMB FILTER AND ITS PRODUCTION METHOD

(75) Inventors: Kazutoyo Watanabe, Fukuoka-ken (JP); Hirohisa Suwabe, Tochigi-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 494 days.

(21) Appl. No.: 10/564,643

(22) PCT Filed: Jul. 14, 2004

(86) PCT No.: PCT/JP2004/010029

§ 371 (c)(1), (2), (4) Date: Jan. 13, 2006

(87) PCT Pub. No.: WO2005/005017

PCT Pub. Date: Jan. 20, 2005

(65) Prior Publication Data

US 2006/0168927 A1    Aug. 3, 2006

(30) Foreign Application Priority Data

Jul. 14, 2003  (JP) .............................. 2003-274339

(51) Int. Cl.
*B01D 46/00* (2006.01)
*F01N 3/022* (2006.01)

(52) U.S. Cl. .................. 55/523; 55/282.3; 55/385.3; 55/482; 55/524; 55/DIG. 5; 55/DIG. 10; 55/DIG. 30; 60/311; 95/273; 428/116

(58) Field of Classification Search ............... 55/282.2, 55/282.3, 385.3, 482, 483, 484, 486, 523, 55/524, DIG. 5, DIG. 10, DIG. 30; 95/273; 60/311; 428/116, 117, 118

See application file for complete search history.

(56) References Cited

U.S. PATENT DOCUMENTS

| 3,785,781 | A | * | 1/1974 | Hervert et al. ................. 60/299 |
| 4,519,820 | A |   | 5/1985 | Oyobe et al. |
| 5,019,142 | A | * | 5/1991 | Waschkuttis ................. 55/523 |
| 5,514,347 | A | * | 5/1996 | Ohashi et al. ............... 428/117 |
| 6,607,804 | B1 | * | 8/2003 | Best et al. ................... 428/116 |
| 6,764,527 | B2 | * | 7/2004 | Ishihara et al. ............... 55/485 |
| 7,090,714 | B2 | * | 8/2006 | Otsubo et al. ................ 55/523 |
| 2002/0108360 | A1 | | 8/2002 | Ishihara et al. |
| 2003/0053940 | A1 | | 3/2003 | Harada et al. |
| 2004/0065068 | A1 | * | 4/2004 | Otsubo et al. ................. 55/523 |

FOREIGN PATENT DOCUMENTS

| EP | 1231363 A2 | 8/2002 |
| EP | 1291061 A1 | 3/2003 |
| JP | 59-028010 | 2/1984 |
| JP | 59-126022 | 7/1984 |
| JP | 04-53211 | 12/1992 |
| JP | 2002-60279 A | 2/2002 |
| JP | 2002-306915 A | 10/2002 |
| JP | 2004-108331 | 4/2004 |

* cited by examiner

*Primary Examiner*—Jason M Greene
(74) *Attorney, Agent, or Firm*—Sughrue Mion, PLLC (57) ABSTRACT

A ceramic honeycomb filter comprising pluralities of ceramic honeycomb structures each having large numbers of flow paths partitioned by cell walls, which are bonded in the direction of the flow paths, predetermined flow paths being sealed by plugs, plugs formed at one end of at least one honeycomb structure being bonded to at least part of plugs formed at one end of a honeycomb structure adjacent to the end of this honeycomb structure.

8 Claims, 9 Drawing Sheets

CERAMIC HONEYCOMB FILTER AND ITS PRODUCTION METHOD

FIELD OF THE INVENTION

The present invention relates to a ceramic honeycomb filter for capturing particulates in an exhaust gas from a diesel engine.

BACKGROUND OF THE INVENTION

From the aspect of protecting global environment, a ceramic honeycomb filter (hereinafter referred to simply as "honeycomb filter") constituted by a ceramic honeycomb structure (hereinafter referred to simply as "honeycomb structure") having both ends on exhaust gas-introducing and -exiting sides sealed alternately is used to remove carbon-based particulates from an exhaust gas discharged from diesel engines.

Figure 5:
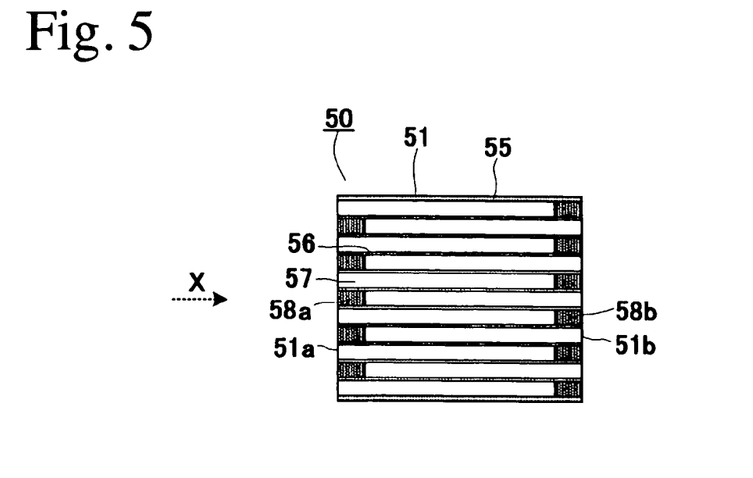
FIG. 5 is a schematic cross-sectional view showing a conventional honeycomb filter.

In a conventional ceramic honeycomb filter 50 shown in FIG. 5, an exhaust gas containing particulates flows into flow paths 57 open at an inlet 51a, passes through cell walls 56 constituted by porous ceramics, and exits from an outlet 51b via adjacent flow paths. During this process, particulates in the exhaust gas are captured by pores of the cell walls 56. As particulates are continuously captured in the honeycomb filter 50, the pores of the cell walls 56 are clogged, resulting in drastic decrease in a capturing function and thus increase in a pressure loss and decrease in engine power. In view of this, a technology was proposed to burn particulates accumulated in the honeycomb filter 50 by an electric heater, a burner, a microwave-generating means, etc. to regenerate the honeycomb filter 50.

However, when particulates captured in the conventional honeycomb filter are burned by an electric heater or a burner, only small amounts of particulates are attached in an upstream region, so that heat generated by the burning of particulates is not sufficient to keep the self ignition of particulates, failing to burn particulates in a downstream region and thus resulting in difficulty in the regeneration of the honeycomb filter.

Also, when regeneration is carried out by a microwave system as shown in JP 59-126022 A, for instance, a portion of the filter near the air supply side is cooled by air supplied, so that the temperature elevation of particulates is hindered, resulting in difficulty in the burning of particulates and narrowing of a region in which the burning of particulates occurs, and thus difficulty in effective regeneration of the entire honeycomb filter. As a result, when air necessary for the burning of particulates is supplied from an exhaust gas inlet side to repeat the capturing of particulates and regenerating the filter, unburned particulates are so accumulated near an end surface of the filter that flow paths open on an exhaust gas inlet side are clogged, thereby losing a particulates-capturing function and resulting in extreme decrease in a filter-regenerating function.

Figure 4:
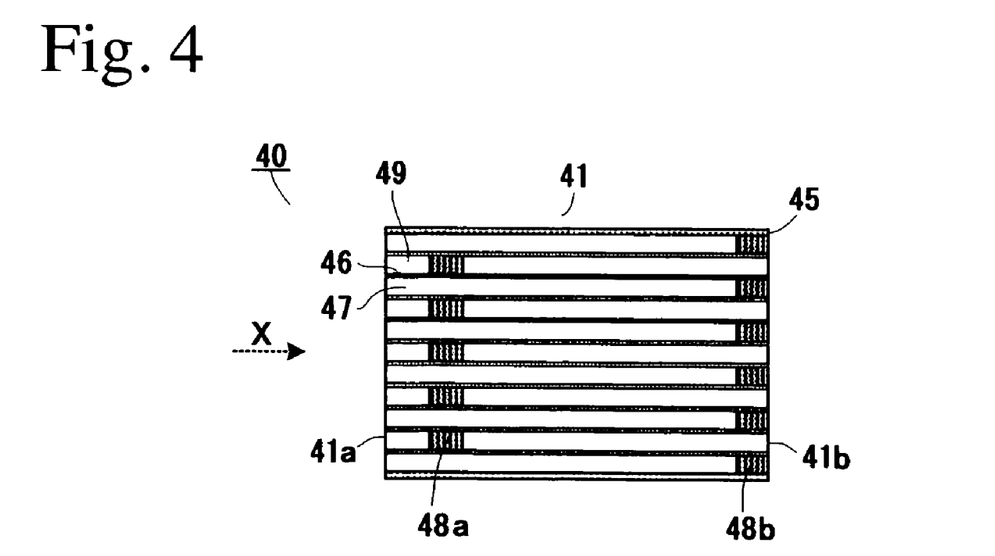
FIG. 4 is a schematic cross-sectional view showing a honeycomb filter described in JP3-68210B.

To solve these problems, JP3-68210B discloses a honeycomb filter having space disposed between plugs positioned on an exhaust gas inlet side and the end surfaces of flow paths on the exhaust gas inlet side. FIG. 4 is a cross-sectional view showing a honeycomb filter 40 described in JP3-68210B. The arrow X indicates an exhaust gas-flowing direction. Because the honeycomb filter of FIG. 4 comprises space 49 between plugs 48a positioned on an upstream side of the flow paths and the flow path inlet ends 41a, particulates in an exhaust gas are captured by partition walls in the space 49 between the plugs 48a on the inlet side and the flow path inlet ends 41a, so that larger amounts of particulates are attached in an upstream region. Accordingly, when particulates are burned by a heating means mounted on the inlet side of the filter, the burning of particulates can be easily conducted in a downstream region.

Figure 3:
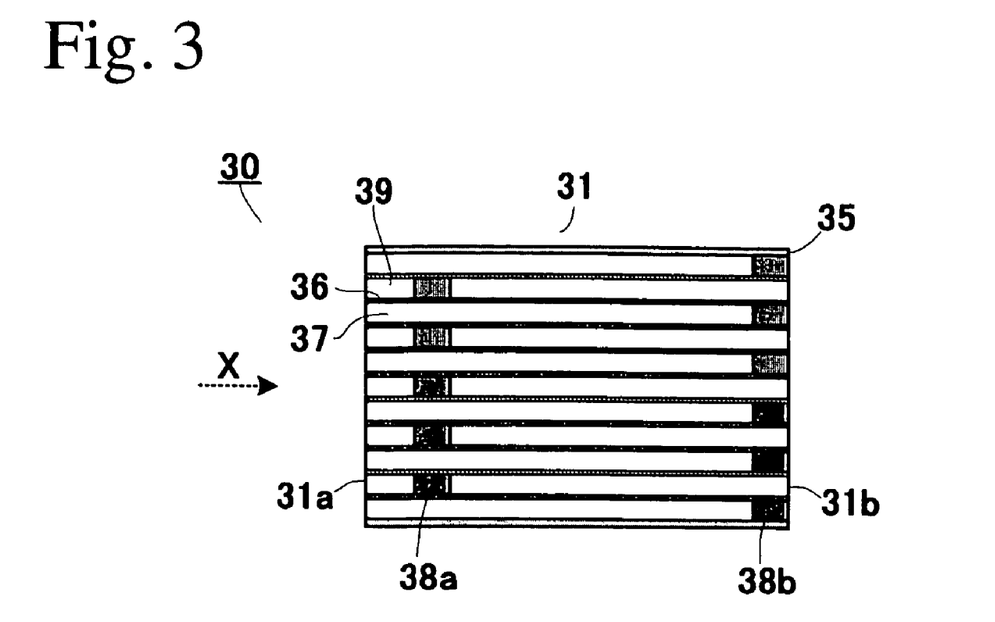
FIG. 3 is a schematic cross-sectional view showing a honeycomb filter described in Japanese Patent 2,924,288.

Japanese Patent 2,924,288 discloses a honeycomb filter-regenerating apparatus comprising a heating chamber mounted onto an exhaust pipe of an engine, a means for generating microwaves that are supplied to the heating chamber, a honeycomb filter contained in the heating chamber for capturing particulates in an exhaust gas, and a means for supplying air to the heating chamber. FIG. 3 is a cross-sectional view showing a honeycomb filter 30 in the honeycomb filter-regenerating apparatus of Japanese Patent 2,924,288. The arrow X indicates an exhaust gas-flowing direction. The honeycomb filter 30 is constituted by a honeycomb structure 31 having a large number of flow paths 37 partitioned by cell walls 36 enclosed by a peripheral wall 35, inlet portions 31a and outlet portions 31b being alternately sealed by plugs 38a, 38b, the plugs 38a being positioned inside the end surfaces of the inlet portion 31a to constitute a heat dissipation-preventing means 39. According to Japanese Patent 2,924,288, when the captured particulates are heated by microwaves, the particulates heated by the heat dissipation-preventing means 39 are prevented from dissipating heat, resulting in increase in a temperature-elevating speed, so that the particulates reach their burning temperature in a short period of time.

In JP3-68210B and Japanese Patent 2,924,288, to conduct regeneration of the entire honeycomb filter efficiently, as shown in FIGS. 3 and 4, the exhaust gas-introducing side plugs are disposed inside the exhaust gas inlet end of the honeycomb filter.

It has been found, however, that when a honeycomb filter having a structure, in which plugs on an exhaust gas inlet side are disposed inside an inlet end of the filter as shown in FIGS. 3 and 4, is actually produced, the following problems occur.

Figure 6A:
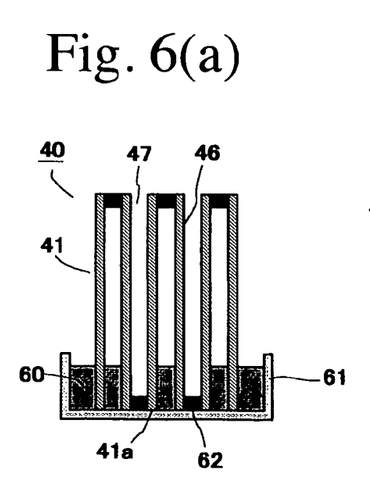
FIG. 6(a) is a schematic cross-sectional view showing a method of forming plugs in a honeycomb filter described in JP3-68210B, in which the honeycomb filter is immersed in a slurry.
Figure 6B:
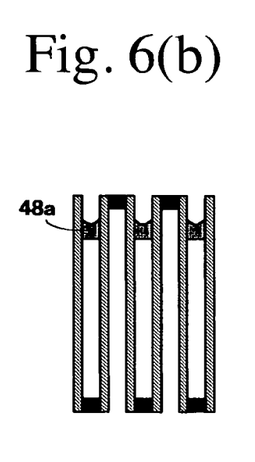
FIGS. 6(b) and 6(c) are schematic cross-sectional views each showing the method of forming plugs in a honeycomb filter, in which the honeycomb structure is placed upside down after the slurry enters.

In the honeycomb filter 40 described in JP3-68210B, the plugs 48a on the inlet side are formed as follows: As shown in FIG. 6(a), the end portions of flow paths needing no plugs are sealed with a wax 62, and the inlet end portions 41a of the honeycomb structure 41 are then immersed in a plug-forming material slurry 60 to cause the slurry 60 to enter into the flow paths 47a not sealed by plugs with a wax. Because the honeycomb structure 41 is made of a porous ceramic and thus water-absorptive, an upper portion of the slurry entering into the flow paths 47 is deprived of water by the cell walls and thus solidified, while a lower portion of the slurry remains unchanged for the lack of cell walls that can remove water. This honeycomb structure is turned upside down as shown in FIG. 6(b), so that a slurry remaining in the flow paths spontaneously falls onto the solidified slurry portion to form plugs 48a. The position of the inlet-side plugs is determined by the height of the slurry entering into the cells.

Figure 6C:
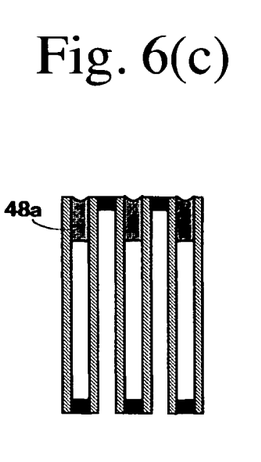

However, the actual trial of the inventors to charge the slurry 60 into the flow paths 47a has revealed that because water is absorbed by the cell walls in contact with the slurry regardless of the position of the slurry, solidification starts simultaneously in the upper and lower portions of the slurry. It is thus difficult to cause solidification only in the upper portion of the slurry, and plugs may be formed up to the ends of the flow passes as shown in FIG. 6(c). Accordingly, it is difficult to provide space as shown in FIGS. 2 and 9-15 of JP3-68210B in cell portions on an upstream side of the inlet-side plugs. This tendency is remarkable, for instance, when the inlet-side plugs are disposed at positions separate from the end surface of the ceramic honeycomb by 10 mm or more. Because it is difficult to surely have space on the upstream side of the plugs on the exhaust gas-introducing side when the honeycomb filter thus formed is actually used to capture particulates, the honeycomb filter cannot exhibit functions of capturing particulates and preventing heat dissipation as expected, failing to efficiently carry out the regeneration of the entire filter, and resulting in a large pressure loss.

In addition, because the degree of solidification of a slurry differs in every flow path, spaces upstream of the inlet-side plugs have different volumes, resulting in uneven pressure loss among the honeycomb filters, and decrease in the production yield of honeycomb filters.

Japanese Patent 2,924,288 fails to disclose a specific method for forming plugs 58a at the inlets 31a.

OBJECTS OF THE INVENTION

Accordingly, an object of the present invention is to provide a ceramic honeycomb filter surely having space on an exhaust gas-introducing side upstream of plugs, so that regeneration is conducted efficiently in the entire filter without pressure loss.

Another object of the present invention is to provide a method for producing a honeycomb filter having a structure in which plugs on an exhaust gas-introducing side are positioned 10 mm or more inside an exhaust gas inlet end, wherein space is surely formed upstream of the plugs on the exhaust gas-introducing side.

DISCLOSURE OF THE INVENTION

The ceramic honeycomb filter of the present invention comprises pluralities of ceramic honeycomb structures each having large numbers of flow paths partitioned by cell walls, which are bonded in the direction of the flow paths, predetermined flow paths being sealed by plugs, plugs formed at one end of at least one honeycomb structure being bonded to at least part of plugs formed at one end of a honeycomb structure adjacent to the end of this honeycomb structure.

In the ceramic honeycomb filter of the present invention, a first ceramic honeycomb structure having large numbers of flow paths partitioned by cell walls with predetermined flow paths sealed by plugs at one end is preferably bonded to a second ceramic honeycomb structure with predetermined flow paths sealed by plugs at both ends, such that the first ceramic honeycomb structure is on an upstream side of an exhaust gas path.

In the ceramic honeycomb filter of the present invention, a ratio A/B of the length A of plugs at one end of one honeycomb structure to the length B of plugs at one end of a honeycomb structure adjacent to this honeycomb structure is preferably 1/9-9/1 in at least one bonded plug.

In the ceramic honeycomb filter of the present invention, pluralities of ceramic honeycomb structures are preferably provided with an integral outer wall.

In the ceramic honeycomb filter of the present invention, a catalyst is supported by the cell walls and/or at least part of the plugs.

The method for producing a ceramic honeycomb filter with predetermined flow paths sealed by plugs according to the present invention comprises bonding pluralities of ceramic honeycomb structures each having large numbers of flow paths partitioned by cell walls in the direction of the flow paths, plugs formed at one end of at least one honeycomb structure being bonded to at least part of plugs formed at one end of a honeycomb structure adjacent to this honeycomb structure.

It is preferable in the method for producing a ceramic honeycomb filter according to the present invention, that one integral (monolithic) ceramic honeycomb structure is cut substantially perpendicularly to the flow paths to form pluralities of ceramic honeycomb structures, and that pluralities of ceramic honeycomb structures are abutted to each other at cut ends, so that they are bonded to each other via plugs formed at the cut ends in the direction of the flow paths.

In the production method of the ceramic honeycomb filter according to the present invention, at least part of plugs formed at one end of the ceramic honeycomb structure preferably have protruding portions.

DESCRIPTION OF THE BEST MODE OF THE INVENTION

In the ceramic honeycomb filter with predetermined flow paths sealed by plugs of the present invention, which is obtained by bonding pluralities of ceramic honeycomb structures each having large numbers of flow paths partitioned by cell walls in the direction of the flow paths with their plugs abutted, plugs formed at one end of at least one honeycomb structure are bonded to at least part of plugs formed at one end of a honeycomb structure adjacent to this honeycomb structure, so that inlet-side plugs can be positioned properly from the inlet end. As a result, space can be surely provided upstream of the exhaust gas inlet-side plugs, making it possible to efficiently conduct the regeneration of the entire honeycomb filter while avoiding pressure loss. The reasons therefor are as follows.

Figure 1:
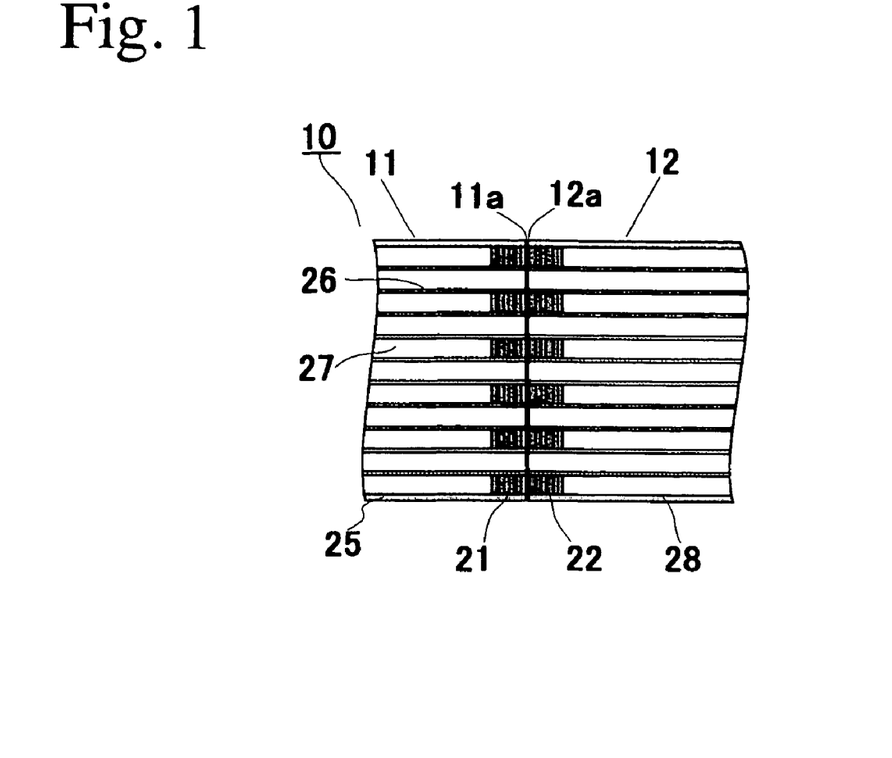
FIG. 1 is a schematic, partial cross-sectional view showing one example of the ceramic honeycomb filter of the present invention.

As shown in FIG. 1, because the ceramic honeycomb filter of the present invention are obtained by bonding pluralities of ceramic honeycomb structures in the direction of the flow paths, plugs 21 formed at one end of at least one honeycomb structure are integrally bonded to plugs 22 formed at least part of a honeycomb structure adjacent to this honeycomb structure, resulting in plugs formed in desired portions separate from the end surface of the honeycomb filter. To form plugs in desired portions at one end of the honeycomb structure, the conventional method as shown in FIGS. 10(a) to 10(e) can be utilized. First, after attaching a masking film 63 to an end surface 11a of the honeycomb structure 11 with an adhesive, the masking film 63 is perforated in a checkerboard pattern. The end surface 11a is then immersed in a plug-forming material slurry 60 in a vessel 61 to cause the plug-forming material slurry to enter into the flow paths through the apertures of the masking film 63 to form plugs 21, and the honeycomb structure is then sintered. The resultant plugs are as high as the plug-forming material slurry entered into the flow paths. Because each flow path having no plug has space for flowing an exhaust gas, the ceramic honeycomb filter of the present invention obtained by bonding these honeycomb structures in the direction of the flow paths can surely have space upstream of the exhaust gas inlet-side plugs, resulting in efficient regeneration in the entire honeycomb filter while preventing increase in the pressure loss.

Because the ceramic honeycomb filter of the present invention is obtained by bonding pluralities of honeycomb structures in the direction of the flow paths with plugs on their end surfaces abutted to each other, the honeycomb structures are strongly bonded to each other. When plugs to be bonded are sintered ones, a ceramic bond or a slurry of the same plug-forming material as the plugs is applied to bonding surfaces of the plugs, and the plugs are press-bonded and sintered again to strongly bond the plugs to each other. On the other hand, when the plugs to be bonded are unsintered ones, mere pressing can easily bond the plugs by their deformation. Accordingly, the plugs of the same material can be strongly and integrally bonded to each other. With a plug-forming material slurry in a bonding interface, stronger bonding can be achieved.

To strongly bond the honeycomb structures to each other, 40% or more of plugs in each ceramic honeycomb structure are preferably bonded to the plugs of an adjacent ceramic honeycomb structure. A bonding ratio expressing the percentage of the bonded plugs is more preferably 50% or more, further preferably 52% or more.

Figure 12A:
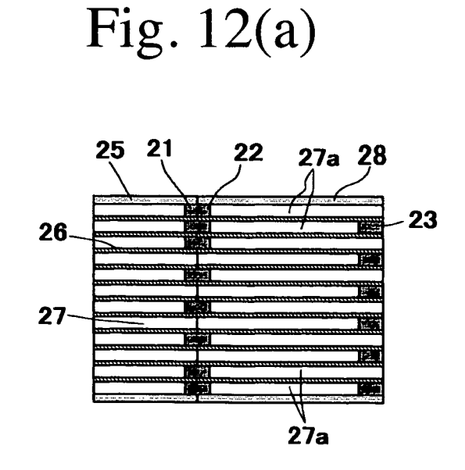
FIGS. 12(a) and 12(b) are schematic cross-sectional views showing the ceramic honeycomb filter of the present invention obtained by bonding the honeycomb structures using plugs in flow paths near a periphery.
Figure 12B:
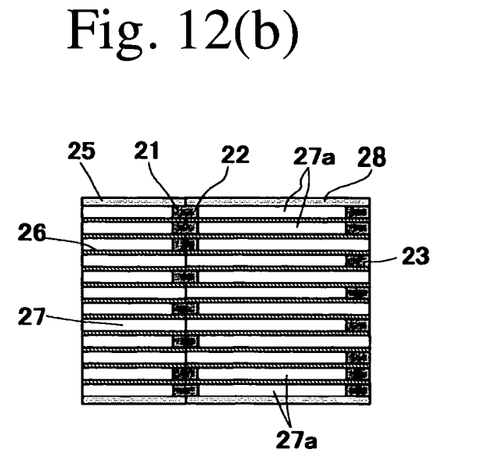

As shown in FIGS. 12(a) and 12(b), all flow paths are preferably provided with plugs, which are bonded to each other, near peripheries of pluralities of ceramic honeycomb structures, to increase the bonding ratio of the plugs. Thus, plugs formed in 50% or more of flow paths in a ceramic honeycomb structure can be surely bonded to those in an adjacent ceramic honeycomb structure. Further, as shown in FIG. 12(b), a structure in which an exhaust gas does not flow through flow paths 27a near a periphery permits them to act as a heat-insulating space, thereby preventing heat generated by the burning of particulates from escaping outside through the outer walls 25, 28, a means for holding the honeycomb filter, and a metal vessel. As a result, the regeneration of the honeycomb filter becomes easy. The term "near a periphery" used herein means a region of up to 20 mm inside the periphery.

The bonding of a first ceramic honeycomb structure in which desired portions of flow paths are sealed by plugs at one end and a second ceramic honeycomb structure in which desired portions of flow paths are sealed by plugs at both ends, such that the first ceramic honeycomb structure is on an upstream side, makes it possible to appropriately keep the positions of the inlet-side plugs. Accordingly, space can be secured upstream of the inlet-side plugs in the ceramic honeycomb filter, enabling the efficient regeneration of the entire filter while preventing increase in pressure loss, for reasons described below.

Figure 2:
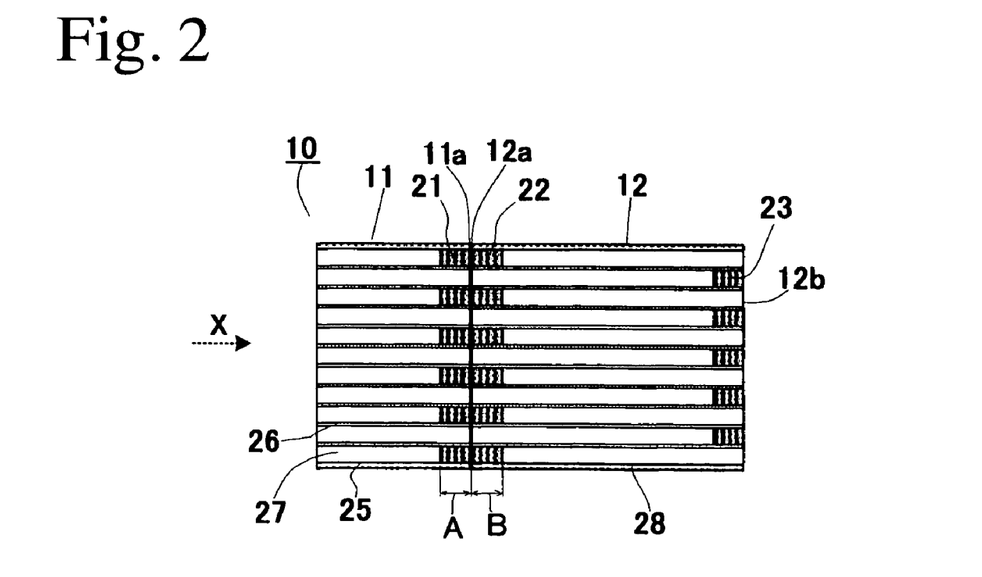
FIG. 2 is a schematic cross-sectional view showing the ceramic honeycomb filter of the present invention.

As shown in FIG. 2, because the first ceramic honeycomb structure 11 with desired portions of flow paths sealed by plugs at one end and the second ceramic honeycomb structure 12 with desired portions of flow paths sealed by plugs at both ends are integrally bonded with plugs 21, 22 abutted to each other, such that the first ceramic honeycomb structure 11 is on the upstream side, the honeycomb filter always has an appropriate distance between the inlet end and the inlet-side plugs, despite the structure that plugs on the exhaust gas-introducing side are disposed inside the exhaust gas inlet end. Because the flow paths free from the plugs act as space permitting an exhaust gas to flow in the honeycomb structures 11 and 12 having plugs in desired portions of the end surface, the ceramic honeycomb filter of the present invention can surely have space permitting an exhaust gas to flow upstream of the inlet-side plugs, thereby enabling the efficient regeneration of the entire honeycomb filter.

In the honeycomb structures bonded by the plugs, a ratio A/B of the length A of plugs in one honeycomb structure to the length B of plugs in the other honeycomb structure is preferably 1/9-9/1. When the plug length ratio A/B is less than 1/9 or more than 9/1, the plugs on one side are too short, resulting in an insufficient bonding area and thus insufficient bonding strength between the plugs and the cell walls. The more preferred plug length ratio A/B is 3/7-7/3, and the total plug length (A+B) is preferably 10-30 mm.

Figure 11A:
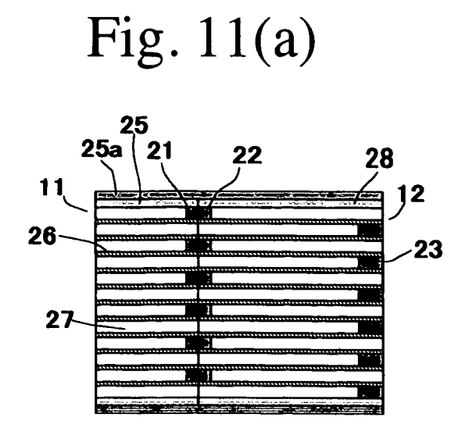
FIGS. 11(a) and 11(b) are schematic cross-sectional views showing the ceramic honeycomb filter of the present invention provided with an integral outer wall.
Figure 11B:
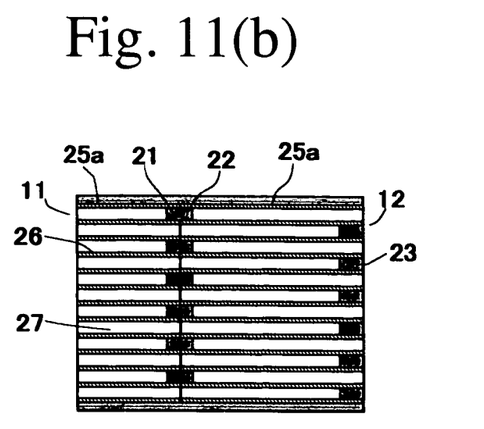

In the ceramic honeycomb filter of the present invention, an integral outer wall strongly bonds pluralities of ceramic honeycomb structures. FIG. 11(a) shows an example that ceramic honeycomb structures each having an outer wall are bonded in the direction of the flow paths. In this example, the honeycomb structures 11 and 12 are bonded via the plugs 21 and 22, and an integral outer wall 25a is formed on the peripheral walls 25, 28. FIG. 11(b) shows an example that ceramic honeycomb structures without peripheral walls are bonded in the direction of the flow paths. In this example, the honeycomb structures 11 and 12 are bonded via the plugs 21 and 22, and an integral outer wall 25a is formed. The ceramic honeycomb structure without a peripheral wall can be produced by extrusion-molding a ceramic material with moldable consistency, removing a peripheral portion from the resultant green honeycomb body by machining, and sintering it. Alternatively, the peripheral portion may be removed by machining after sintering the green honeycomb body. In the ceramic honeycomb structure free from a peripheral wall, flow paths open on a periphery because of no cell wall coverage extend as U-grooves substantially axially.

In the case of the ceramic honeycomb structure, in which flow paths open on a periphery because of no cell wall coverage extend as U-grooves substantially axially, the U-grooves are preferably filled with a ceramic material to form an outer wall, (a) with space provided least partially between the outer wall and the U-grooves, or (b) with space being open in at least part of the outer wall. This reason is as follows. When an integral outer wall 25a is formed on the ceramic honeycomb filter constituted by pluralities of ceramic honeycomb structures having U-groove-shaped flow paths axially on a periphery, space open to the outside at least partially between the outer wall and the U-grooves and/or at least partially on the outer wall provides the ceramic honeycomb filter with improved resistance to quick heating and cooling by an exhaust gas or heat shock at the time of burning particulates.

Figure 13A:
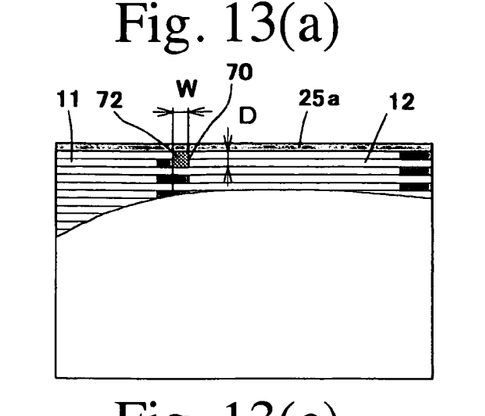
FIGS. 13(a)-(c) are schematic, partial cross-sectional views showing the ceramic honeycomb filter of the present invention having steps and chamfers at corners of bonded portions of honeycomb structures.
Figure 13B:
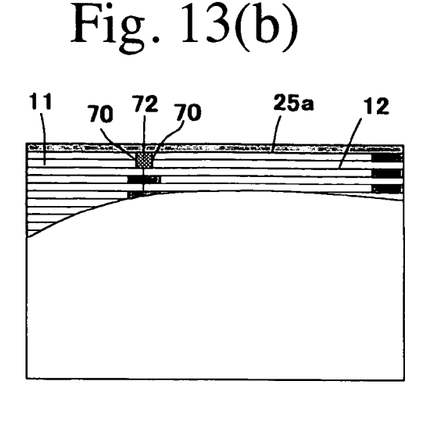
Figure 13C:
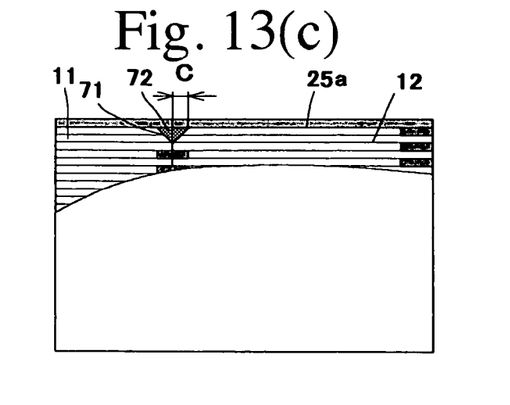

As shown in FIGS. 13(3)-(c), a step 70 or a chamfer 71 is formed at peripheries of bonding surfaces of pluralities of ceramic honeycomb structures in the ceramic honeycomb filter of the present invention, and a ceramic bond or a slurry 72 is applied thereto to form a bonding layer. As a result, pluralities of ceramic honeycomb structures are strongly bonded to each other in the direction of the flow paths. FIGS. 13(a) and 13(b) show a ceramic honeycomb filter with an integral outer wall, in which a step 70 is formed, and FIG. 13(c) shows a ceramic honeycomb filter with a chamfer 71. When the ceramic bond or the slurry 72 enters into the flow paths through the step 70 or the chamfer 71, pluralities of ceramic honeycomb structures are more strongly bonded. The size of the step 70 is preferably 1-15 mm in width W and 1-10 mm in depth D. The chamfer C is preferably 1-8 mm. More preferably, the width W is 1-8 mm, the depth D is 1-5 mm, and the chamfer C is 1-4 mm.

In the ceramic honeycomb filter of the present invention, a catalyst is preferably supported by the cell walls and/or at least part of the plugs. By the action of a catalyst supported on the surfaces of the cell walls inclined to the exhaust gas-introducing direction, the capturing and burning of particulates on the cell walls easily occur, preventing particulates from being accumulated predominantly near the plugs on the exhaust gas outlet side. Preferable as the catalysts are oxidation catalysts and particulates-burning catalysts containing platinum-group metals. The oxidation catalysts containing platinum-group metals may be, for instance, Pt, Pd, Ru, Rh or combinations thereof, or their oxides, etc., and may contain alkaline earth metal oxides and rare earth oxides, etc. When a high-specific-surface-area material such as active alumina, for instance, γ-alumina, etc. is contained in the catalyst containing a platinum-group metal, the exhaust gas is in contact with the platinum-group metal, etc. in a large area, resulting in higher efficiency of cleaning the exhaust gas. The particulates-burning catalysts are preferably base metal catalysts, typically catalysts comprising lanthanum, cesium and vanadium ($La/Cs/V_2O_3$).

A catalyst having different functions may be supported by cell walls upstream and downstream of the inlet-side plugs, if necessary. In the ceramic honeycomb filter of the present invention comprising pluralities of honeycomb structures bonded via plugs, the cell walls are disrupted by the exhaust gas inlet-side plugs, so that different catalysts can surely be supported by cell walls on the upstream and downstream sides.

Figure 14A:
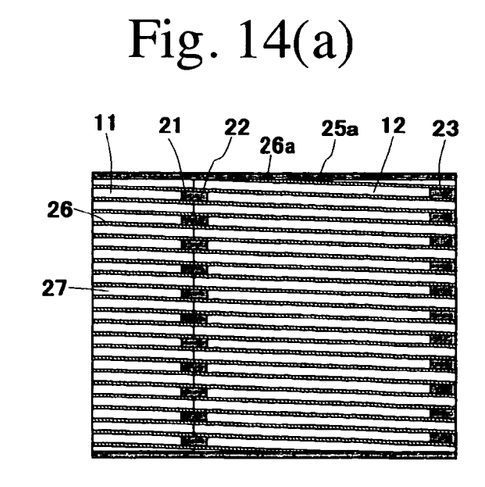
FIGS. 14(a) and 14(b) are schematic cross-sectional views showing one example of the ceramic honeycomb filter of the present invention with cell walls inclined to an outer wall.
Figure 14B:
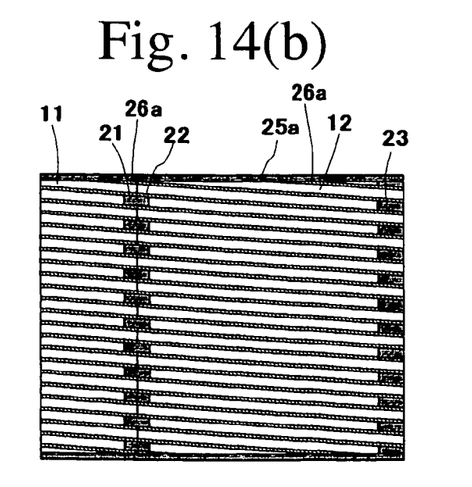

In the ceramic honeycomb filter having an integral outer wall according to the present invention, it is preferable that a substantially cylindrical outer wall is substantially perpendicular to the end surface, that the cell walls has surface roughness of 10 μm or more by a maximum height Ry, and that cell walls are substantially parallel in a cross section in the direction of the flow paths and at least partially inclined to the outer wall. With such a structure, as shown in FIG. 14(a) and 14(b), for instance, the exhaust gas containing particulates entering into the flow paths are deflected and disturbed by the inclined cell walls 26, so that particulates are easily captured by the cell walls 26 having surface roughness Ry of 10 μm or more. It is thus possible to prevent particulates from being accumulated at a high concentration on the upstream side of the exhaust gas outlet-side plugs 23, particularly in flow paths downstream of the exhaust gas inlet-side plugs in the honeycomb filter, thereby capturing particulates substantially uniformly in a longitudinal direction. It is thus possible to prevent the filter from being melted and damaged during the regeneration of the filter, by the self-heat generation of particulates accumulated at a high concentration upstream of the exhaust gas outlet-side plugs. Accordingly, in the ceramic honeycomb filter of the present invention having a structure comprising space upstream of the exhaust gas inlet-side plugs for burning particulates, the efficient regeneration of the filter can be carried out while preventing melting and damage.

When the surface roughness of the cell walls is 10 μm or more by a maximum height Ry, it makes it possible to efficiently capture particulates in the exhaust gas. The surface roughness of cell walls is more preferably 20-100 μm by a maximum height Ry. The maximum height Ry of cell walls is determined according to JIS B 0601-1994 from surface roughness obtained by longitudinally measuring a surface shape of the filter.

In a cross section obtained by bisecting the ceramic honeycomb filter of the present invention along the cell walls, the number of cell walls whose longitudinal ends are in contact with the outer wall is preferably 1-6. When at least part of cell walls having the above surface roughness are inclined to the outer wall in this range, particulates in the exhaust gas can easily be captured by cell walls from the inlet side to the outlet side. When the number of cell walls whose longitudinal ends are in contact with the outer wall is less than 1, the inclination of the cell walls to the outer wall is too small, failing to cause large disturbance in the exhaust gas in the flow paths, thus resulting in small effect of preventing the high-concentration accumulation of particulates near the exhaust gas outlet-side plugs. On the other hand, when the number of cell walls having longitudinal ends in contact with the outer wall exceeds 6, the percentage of flow paths not penetrating from the inlet side to the outlet side increases, providing the filter with a reduced effective area, and resulting in increased pressure loss. In a plane bisecting the ceramic honeycomb structure, the number of cell walls having longitudinal ends in contact with the outer wall is preferably 1-4. FIG. 14(a) shows an example in which the number of cell walls having longitudinal ends 26a in contact with the outer wall 25a is 1, and FIG. 14(b) shows an example in which the number of cell walls having longitudinal ends 26a in contact with the outer wall 25a is 2.

Figure 15A:
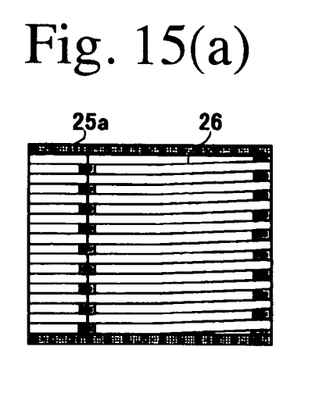
FIGS. 15(a)-(c) are schematic cross-sectional views showing another example of the ceramic honeycomb filter of the present invention with cell walls inclined to an outer wall.
Figure 15B:
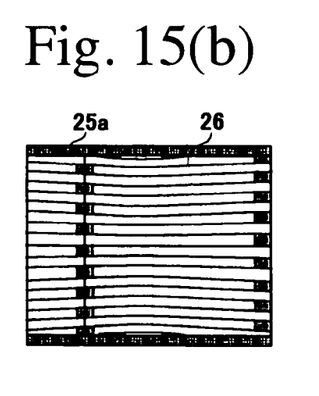
Figure 15C:
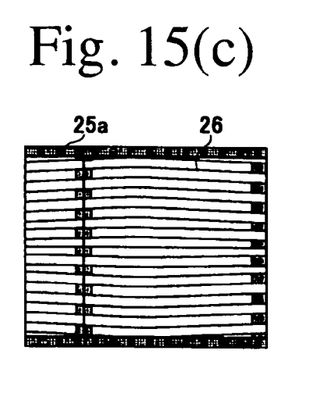

All cell walls need not be inclined to the outer wall, but only some of the cell walls or portions of the cell walls may be inclined. The inclination angle of the cell walls need not be constant over the entire honeycomb structure, but may change from position to position in the honeycomb structure. FIGS. 15(a)-(c) show examples in which the inclination angle of cell walls is not constant over the entire honeycomb structure. The inclination of the cell walls 26 shown in FIGS. 15(a)-(c) may be determined by adjusting the holding direction and force of a green body being extrusion-molded, etc.

In the method of the present invention for producing a ceramic honeycomb filter with predetermined flow paths sealed by plugs by bonding pluralities of ceramic honeycomb structures each having large numbers of flow paths partitioned by cell walls in the direction of the flow paths, plugs formed at one end of at least one honeycomb structure are bonded to at least part of plugs formed at one end of a honeycomb structure adjacent to this honeycomb structure, so that pluralities of ceramic honeycomb structures can surely and strongly be bonded in the direction of the flow paths.

As shown in FIGS. 13(a)-(c), a ceramic bond or a slurry can be applied to a step or a chamfer formed in peripheral portions of the bonding surfaces of the ceramic honeycomb structures to form a bonding layer, which strongly bonds pluralities of ceramic honeycomb structures in the direction of the flow paths.

Detailed explanation will be made below on an example in which a ceramic honeycomb structure having plugs at one end is bonded to a ceramic honeycomb structure having plugs at both ends in the direction of the flow paths. The honeycomb structure 11 having plugs 21 at one end and the honeycomb structure 12 having plugs 22 and 23 at both ends have the same cell wall thickness and pitch. As shown in FIG. 2, both honeycomb structures are integrally bonded by abutting and pressing the plugs 21, 22 of the honeycomb structures 11, 12. This can set the inlet-side plugs at appropriate positions from the inlet end of the honeycomb filter, thereby surely having space upstream of the inlet-side plugs.

When the sintered plugs are bonded, it is preferable to press-bond the plugs via a ceramic bond or a plug-forming material slurry and sinter them again. On the other hand, when the unsintered plugs are bonded, they can easily be adhered by utilizing their deformability, and subsequent sintering can strongly bond the plugs. Further, with a plug-forming material slurry in a bonding interface, a larger bonding effect can be obtained.

The ceramic honeycomb structures before abutting are preferably sintered bodies when sintered plugs are used, while they may be dried green bodies or sintered bodies when unsintered plugs are used.

Figure 8:
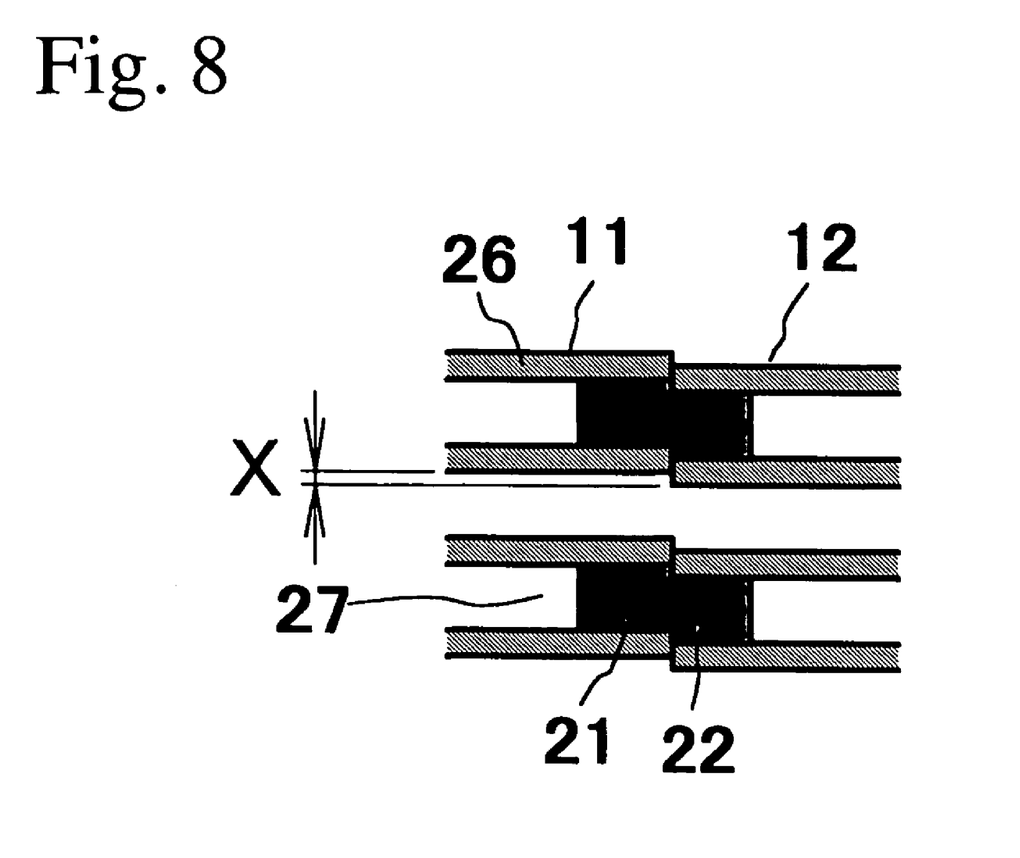
FIG. 8 is a partial cross-sectional view showing a bonding portion of the honeycomb structures constituting the ceramic honeycomb filter of the present invention.

Flow paths in pluralities of honeycomb structures used for the ceramic honeycomb filter of the present invention need not be completely aligned with each other within a range not deteriorating the pressure loss of the filter. As shown in FIG. 8, flow paths in adjacent honeycomb structures 11, 12 may be radially displaced by a distance X in the bonding portion of the ceramic honeycomb filter. The displacement X is preferably from 0 mm to a distance substantially equal to the thickness of a cell wall. When the displacement X exceeds the thickness of a cell wall, too large pressure loss occurs.

It is preferable to form plugs at one end or both ends of pluralities of ceramic honeycomb structures obtained by cutting a long ceramic honeycomb substantially perpendicularly to its longitudinal direction, and bond pluralities of ceramic honeycomb structures in the direction of the flow paths such that the plugs are abutted to each other. This is because flow paths in adjacent ceramic honeycomb structures are in agreement with each other when pluralities of ceramic honeycomb structures are obtained by cutting an integral or monolithic ceramic honeycomb.

Figure 7A:
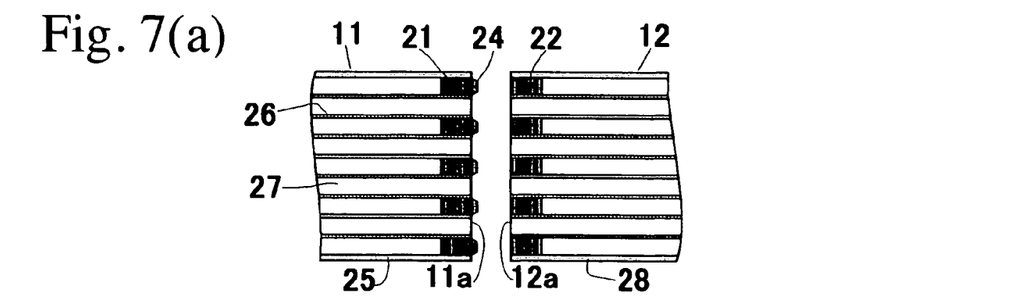
FIGS. 7(a)-(e) are schematic cross-sectional views showing the method for producing the ceramic honeycomb filter of the present invention.
Figure 7B:
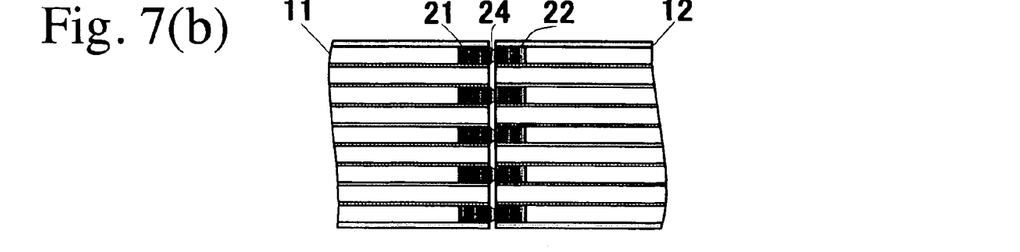
Figure 7C:
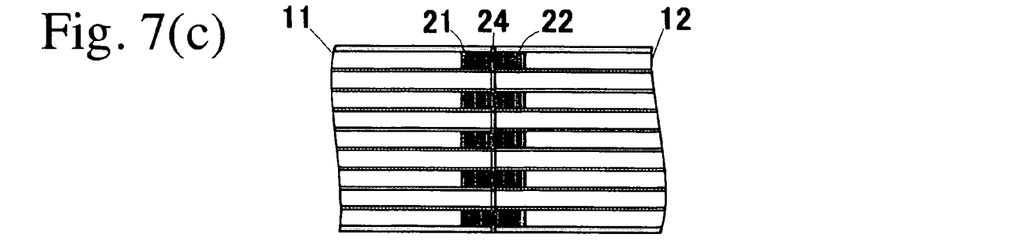
Figure 7D:
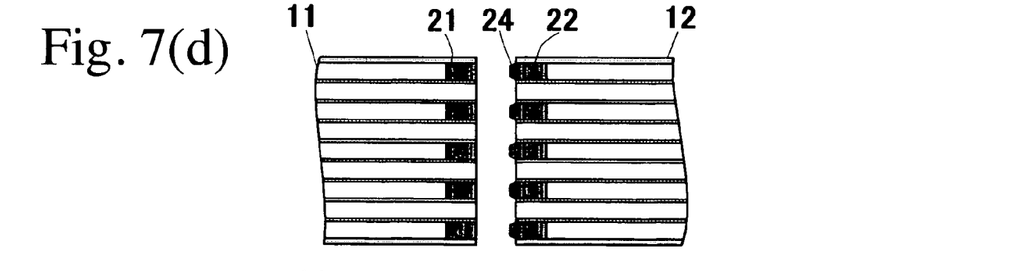
Figure 7E:
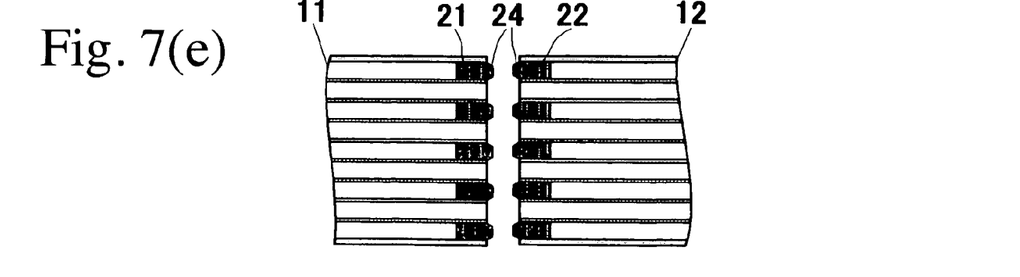

The reason why at least part of plugs formed at one end of a ceramic honeycomb structure preferably have protruding portions will be explained referring to FIGS. 7(a)-(d). When the plugs 21 of the honeycomb structure 11 have protruding portions 24, and when the plugs 21, 22 of the honeycomb structures 11, 12 are not dried (in a moldable state) as shown in FIG. 7(a), the abutting and pressing of the plugs 21 and 22 as shown in FIG. 7(b) deforms the protruding portions 24 predominantly, so that the plugs 21 and 22 are integrated as shown in FIG. 7(c). When the plugs are dried and sintered in this state, the plugs 21 and 22 are strongly bonded to each other, so that the honeycomb structures 11 and 12 are strongly integrated. The protruding portions 24 may be formed on the plugs 22 of the ceramic honeycomb structure 12 as shown in FIG. 7(d), or in both ceramic honeycomb structures 11, 12 as shown in FIG. 7(e).

Figure 10A:
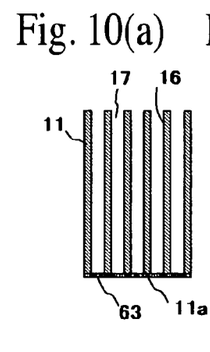
FIGS. 10(a)-(e) are schematic views showing a conventional method of forming plugs at the ends of flow paths in a honeycomb structure.
Figure 10B:
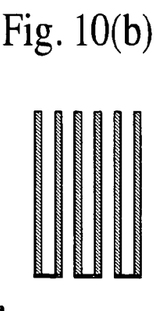
Figure 10C:
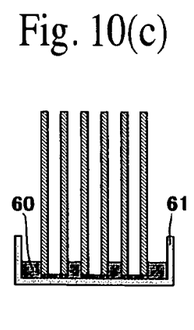
Figure 10D:
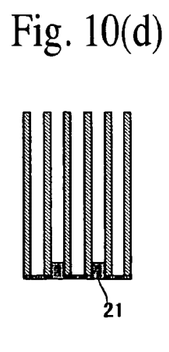
Figure 10E:
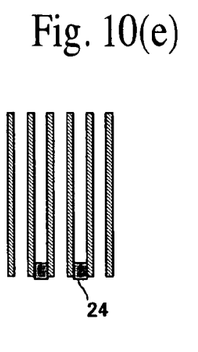

The protruding portions 24 may be formed by adjusting the thickness of a masking film attached to an end surface of a honeycomb structure. FIG. 10(e) shows that protruding portions as high as the thickness of a masking film are formed. The protruding portions 24 are preferably as high as 0.01-0.5 mm. When the plugs are unsintered ones, the plugs are made closer by the protruding portions 24 in the press-bonding step, resulting in easy integration.

Materials used for the cell walls and plugs of the ceramic honeycomb filter of the present invention for removing particulates from an exhaust gas from a diesel engine are preferably those having excellent heat resistance, particularly ceramics comprising as a main component at least one selected from the group consisting of cordierite, alumina, mullite, aluminum titanate, silicon nitride, carbon nitride and LAS. Among them, a cordierite-based ceramic honeycomb filter is excellent in heat shock resistance, because it is inexpensive and excellent in heat resistance and corrosion resistance and also low in thermal expansion.

The ceramic honeycomb filter of the present invention preferably has a cell wall porosity of 50-80%. Because an exhaust gas passes through pores in the cell walls, the cell wall porosity of less than 50% would lead to increase in the pressure loss of the ceramic honeycomb filter and decrease in an engine power. On the other hand, when the cell wall porosity exceeds 80%, the cell walls have so reduced strength that they may be damaged by heat shock and mechanical vibration during operation.

The present invention will be explained in further detail referring to Examples below, without intension of restricting the present invention thereto.

EXAMPLE 1

The ceramic honeycomb filter 10 of Example 1 shown in FIG. 2 is made of a cordierite ceramic, having an outer diameter of 267 mm, a length of 304.5 mm, a cell wall thickness of 0.3 mm, a cell wall pitch of 1.5 mm, a cell wall porosity of 65%, and an average pore diameter of 22 µm. Inlet-side plugs were positioned 92 mm from the inlet end. The ceramic honeycomb filter 10 was constituted by integrally bonding a honeycomb structure 11 having plugs 21 at one end to a ceramic honeycomb structure 12 having plugs 22, 23 at both ends, with these plugs aligned in the direction of the flow paths 27.

A cordierite-forming material powder comprising powders of kaolin, talc, fused silica, aluminum hydroxide, alumina, etc. was fully dry-mixed with methylcellulose as a molding aid, and graphite and an organic foaming agent as pore-forming agents, and then mixed with water, and further fully blended to form a ceramic material with moldable consistency. This ceramic material was extrusion-molded to form a green body having a honeycomb structure integrally comprising an outer wall and cell walls, which had a large number of flow paths 27 partitioned by cell walls 26 inside the outer wall. After heat-drying this green body in a microwave-drying furnace, it was sintered at a maximum temperature of 1410° C. for about 8 days. The resultant honeycomb structure 11 had an outer diameter of 267 mm, a length of 100 mm, a wall thickness of 0.3 mm, a pitch of 1.5 mm, a cell wall porosity of 65%, and an average pore size of 22 µm. Also, the honeycomb structure 12 had an outer diameter of 267 mm, a length of 204 mm, a wall thickness of 0.3 mm, a pitch of 1.5 mm, a cell wall porosity of 65%, and an average pore size of 22 µm.

After attaching a masking film to an end surface 11a of the honeycomb structure 11 with an adhesive, the masking film was perforated in a checkerboard pattern. An end portion of the honeycomb structure 11 was immersed in a plug-forming material slurry comprising a cordierite-forming material contained in a vessel to cause the plug-forming material slurry to flow into the flow paths through the apertures of the masking film, thereby forming inlet-side plugs 21. The plugs 21 were as long as 8 mm from the end surface 11a of the honeycomb structure 11. With the thickness of the masking film adjusted, a 0.5-mm-long protruding portion 24 was formed on each plug 21.

Similarly, after attaching masking films to an inlet-side end surface 12a and an outlet-side end surface 12b of the honeycomb structure 12 with an adhesive, the masking films were perforated in a checkerboard pattern. The inlet-side end surface 12a was immersed in the plug-forming material slurry in a vessel to cause the plug-forming material slurry to flow into the flow paths through the apertures of the masking film, thereby forming inlet-side plugs 22. Similarly, the outlet-side end surface 12b was immersed in the plug-forming material slurry to form outlet-side plugs 23. The plugs 22 were as long as 8 mm from the end surface 12a, and the plugs 23 were as long as 12 mm from the end surface 12b.

With positioning metal pins inserted into several flow paths of the honeycomb structures 11, 12, the honeycomb structures 11, 12 were positioned with the plugs 21 with protruding portions 24 of the honeycomb structure 11 abutted to the plugs 22 of the honeycomb structure 12, such that the corresponding flow paths are aligned, and the plugs 21 and 22 were then integrally press-bonded. The abutting and press-bonding of the plugs 21 and 22 are shown in FIGS. 7(a) and 7(b). Because the plugs were in an unsintered state, the cordierite-forming material forming the plugs 21 and 22 were made closer by abutting. After drying, the metal pins were removed, and sintering was conducted at 1400° C. to bond themselves and also the plugs to the cell walls by a cordierite-sintering reaction, thereby integrating the honeycomb structures 11 and 12.

The integral bonding of two honeycomb structures 11, 12 in the direction of the flow paths 27 provided a ceramic honeycomb filter having an outer diameter of 267 mm, a length of 304.4 mm, a cell wall thickness of 0.3 mm, and a cell wall pitch of 1.5 mm, with plugs on the exhaust gas-introducing side inside the exhaust gas inlet end, and with space upstream of the plugs. By adjusting the length of the honeycomb structures 11 and 12, the length of the plugs 21, 22 and their positions from the exhaust gas-inlet end can be precisely controlled.

EXAMPLE 2

The ceramic honeycomb filter 10 of Example 2 shown in FIG. 11(b) was made of cordierite ceramic, having an outer diameter of 267 mm, a length of 304.8 mm, a cell wall thickness of 0.3 mm, and a cell wall pitch of 1.5 mm, the cell walls 26 having a porosity of 63% and an average pore size of 21 µm. The inlet-side plugs were positioned 92 mm from the inlet end. The ceramic honeycomb filter 10 was constituted by integrally bonding a honeycomb structure 11 having plugs 21 at one end to a ceramic honeycomb structure 12 having plugs 22, 23 at both ends, with these plugs aligned in the direction of the flow paths 27.

Figure 9A:
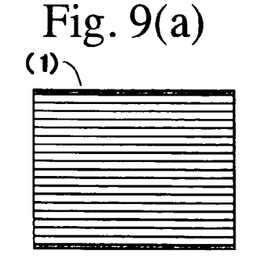
FIGS. 9(a)-(g) are schematic cross-sectional views showing the production steps of a ceramic honeycomb filter in Example 2.
Figure 9B:
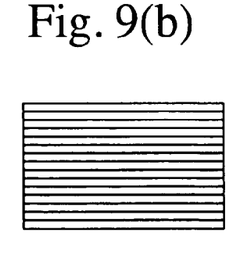
Figure 9C:
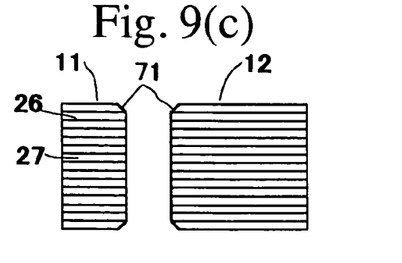
Figure 9D:
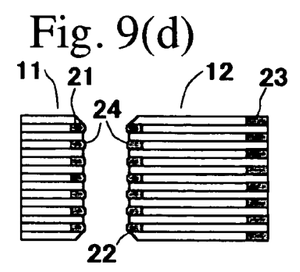
Figure 9E:
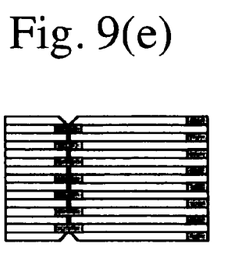
Figure 9F:
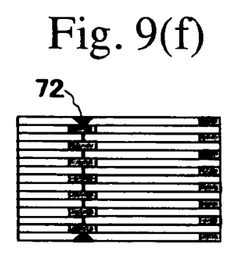
Figure 9G:
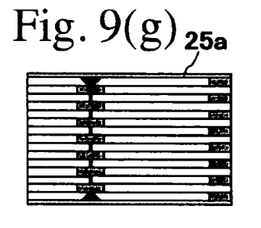

The ceramic honeycomb filter 10 was produced as shown in FIGS. 9(a)-(g). FIG. 9(a) shows a green body 1 extruded in the form of a honeycomb and dried, FIG. 9(b) shows a honeycomb structure sintered after a peripheral portion of the extruded green body 1 was removed by machining, FIG. 9(c) shows honeycomb structures 11, 12 obtained by cutting the sintered honeycomb structure in a direction perpendicular to flow paths and chamfering their cut portions, FIG. 9(d) shows the honeycomb structures 11, 12 provided with plugs, FIG. 9(e) shows the honeycomb structures 11, 12, which were integrally bonded to each other via plugs protruding portions 24, FIG. 9(f) shows the honeycomb structures 11, 12 whose chamfers 71 were filled with a ceramic bond, and FIG. 9(g) shows the honeycomb structures 11, 12 integrally coated with an outer wall.

(a) Molding and Drying

A ceramic material with moldable consistency was produced by adding methylcellulose, graphite and an organic foaming agent to a cordierite-forming material powder, sufficiently dry-mixing them, adding water thereto, and further sufficiently blending them in the same manner as in Example 1. This ceramic material was extrusion-molded to produce a green honeycomb body having large numbers of flow paths partitioned by cell walls inside a peripheral wall integral with the cell walls. This green honeycomb body was heat-dried in an induction-drying furnace or a microwave-drying furnace to vaporize water in the green body.

(b) Machining of Peripheral Portion and Sintering

A peripheral portion of the green honeycomb body was removed by machining to provide the green honeycomb body with outermost flow paths in the form of U-grooves. This green honeycomb body was sintered at a maximum temperature of 1410° C. for about 8 days. The resultant sintered honeycomb body had an outer diameter of 262 mm, a length of 310 mm, a wall thickness of 0.3 mm, a pitch of 1.5 mm, a cell wall porosity of 63%, and an average pore size of 21 µm.

(c) Cutting and Chamfering

After cutting the sintered honeycomb body in a direction perpendicular to the flow paths, cut surfaces were ground to provide a 100-mm-long first honeycomb structure 11 and a 204-mm-long second honeycomb structure 12. An outlet-side end surface of the honeycomb structure 11 and an inlet-side end surface of the honeycomb structure 12 were chamfered with a chamfer length C of 4 mm.

(d) Formation of Plugs

After attaching a masking film 11 to an end surface 11a of the honeycomb structure with an adhesive, the masking film was perforated in a checkerboard pattern, and the end surface 11a was immersed in a plug-forming material slurry of a cordierite-forming material in a vessel to cause the plug-forming material slurry to enter into the flow paths through the apertures of the masking film, thereby forming inlet-side plugs 21. The plugs 21 were as long as 8 mm from the end surface 11a of the honeycomb structure 11. With the thickness of the masking film adjusted, 0.5-mm-high protruding portions 24 were formed on the plugs 21.

After attaching masking films to the inlet-side end surface 12a and outlet-side end surface 12b of the honeycomb structure 12 with an adhesive, the masking films were perforated in a checkerboard pattern, and the inlet-side end surface 12a was immersed in a plug-forming material slurry in a vessel to cause the plug-forming material slurry to enter into the flow paths through the apertures of the masking film, thereby forming inlet-side plugs 22. The plugs 22 were as long as 8 mm from the end surface 12a of the honeycomb structure 12. Similarly, the plugs 22 were provided with 0.5-mm-high protruding portions. Also, the outlet-side end surface 12b of the honeycomb structure 12 was immersed in the plug-forming material slurry to form outlet-side plugs 23. The plugs 23 were as long as 12 mm from the end surface 12b.

(e) Integral Bonding

After positioning the honeycomb structures 11, 12 to be bonded such that their flow paths were aligned, using positioning marks obtained at the time of cutting and positioning pins inserted into several flow paths of the honeycomb structures 11, 12, the plugs 21 with protruding portions 24 of the honeycomb structure 11 and the plugs 22 of the honeycomb structure 12 were abutted and press-bonded to integrally bond them. Because the plugs were unsintered ones, the plugs 21, 22 of a cordierite-forming material were easily integrated by abutting. After drying, the positioning pins were removed, and sintering was conducted at 1400° C. to integrate the honeycomb structures 11 and 12 with their plugs bonded to each other and to cell walls by a cordierite-sintering reaction.

(f) Filling of Bond

An alumina ceramic bond 72 was charged into the chamfer 71 and dried.

(g) Formation of Outer Wall

An outer wall was formed by filling peripheral U-grooves of the ceramic honeycomb filter with a paste comprising cordierite particles having an average particle size of 20 µm and colloidal silica, and drying, to obtain a ceramic honeycomb filter having an outer diameter of 267 mm.

Thus, the bonding of the two honeycomb structures 11, 12 in the direction of the flow paths 27 provided a honeycomb filter having an outer diameter of 267 mm, a length of 304.8 mm, a cell wall thickness of 0.3 mm, and a cell wall pitch of 1.5 mm, with plugs on an exhaust gas-introducing side disposed inside the exhaust gas inlet end, and with space provided upstream of the plugs. With the length of the honeycomb structures 11, 12 adjusted, the length of the plugs 21, 22 and their positions from the exhaust gas-introducing end can be precisely controlled. Also, the filling of a bond to the chamfer, and the formation of a common outer wall on the honeycomb structures 11, 12 provided a ceramic honeycomb filter with excellent bonding strength.

EXAMPLE 3

The ceramic honeycomb filter 10 of Example 3 shown in FIGS. 14(a) and 14(b) was made of cordierite ceramic, having an outer diameter of 267 mm, a length of 304.3 mm, a cell wall thickness of 0.3 mm, and a cell wall pitch of 1.5 mm, the cell walls 26 having a porosity of 65%, an average pore size of 22 µm, and a surface roughness of 45 µm. The inlet-side plugs were positioned 92 mm from the inlet end. The ceramic honeycomb filter 10 was constituted by integrally bonding a first honeycomb structure 11 having plugs 21 at one end to a ceramic honeycomb structure 12 having plugs 22, 23 at both ends, with these plugs aligned in the direction of the flow paths 27.

Figure 16A:
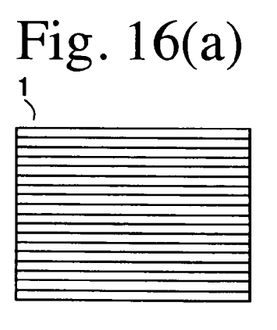
FIGS. 16(a)-(f) are schematic cross-sectional views showing an example of the production of the ceramic honeycomb filter of the present invention with cell walls inclined to an outer wall.
Figure 16B:
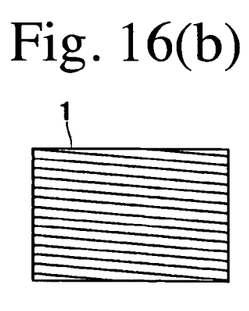
Figure 16C:
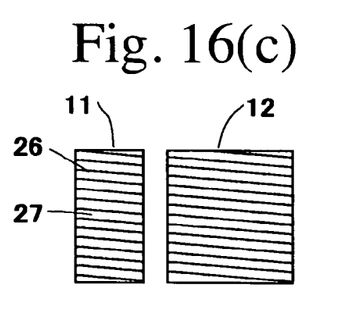
Figure 16D:
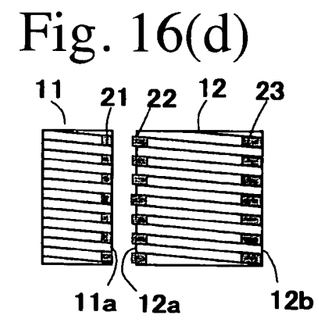
Figure 16E:
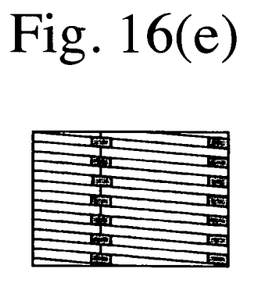
Figure 16F:
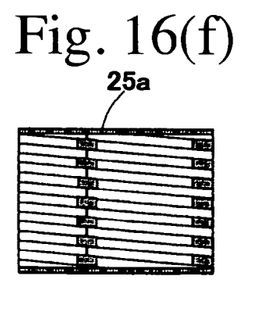

The ceramic honeycomb filter 10 was produced as shown in FIGS. 16(a)-(f). FIG. 16(a) shows a honeycomb structure 1 after sintering, FIG. 16(b) shows a honeycomb structure 1 with inclined cell walls, which was obtained by removing a peripheral portion from the honeycomb structure 1 of FIG. 16(a), FIG. 16(c) shows honeycomb structures 11, 12 obtained by cutting the honeycomb structure of FIG. 16(b) in a direction perpendicular to flow paths, FIG. 16(d) shows the honeycomb structures 11, 12 provided with plugs, FIG. 16(e) shows the honeycomb structures 11, 12 integrally bonded to each other via plugs, and FIG. 16(f) shows a ceramic honeycomb filter with an outer wall formed on a peripheral surface.

(a) Molding and Sintering

The same cordierite-forming material powder as in Example 1 was fully dry-mixed with methylcellulose as a molding aid, and graphite and an organic foaming agent as pore-forming agents, and then mixed with water, and further fully blended to form a ceramic material with moldable consistency. This ceramic material was extrusion-molded to form a green honeycomb body having large numbers of flow paths partitioned by cell walls, which were integral with a peripheral wall. This green body was heat-dried in an induction-drying furnace or a microwave-drying furnace to vaporize water. The dried green body was sintered at a maximum temperature of 1410° C. for about 8 days. The resultant honeycomb structure had an outer diameter of 275 mm, a length of 310 mm, a wall thickness of 0.3 mm, a pitch of 1.5 mm, a cell wall porosity of 65%, and an average pore size of 22 µm.

(b) Machining of Periphery and End Surface

To obtain a honeycomb structure with inclined cell walls, a peripheral portion of the sintered honeycomb body was removed by machining, to provide a sintered honeycomb body having an outer diameter of 264 mm, which had U-grooves on a periphery. An end portion of the sintered honeycomb body was cut away such that its end surface was substantially perpendicular to the periphery.

(c) Cutting

After cutting the sintered honeycomb body in a direction perpendicular to the flow paths with positioning marks disposed at a cut portion, each cut surface was ground to provide a 100-mm-long first honeycomb structure 11 and a 204-mm-long second honeycomb structure 12.

(d) Formation of Plugs

After attaching a masking film to an end surface 11a of the honeycomb structure 11 with an adhesive, the masking film was perforated in a checkerboard pattern, and the end surface 11a was immersed in a plug-forming material slurry containing a cordierite-forming material in a vessel to cause the plug-forming material slurry to enter into the flow paths through the apertures of the masking film, thereby forming inlet-side plugs 21. The plugs 21 were as long as 8 mm from the end surface 11a of the honeycomb structure 11.

After attaching masking films to the inlet-side end surface 12a and outlet-side end surface 12b of the honeycomb structure 12 with an adhesive, the masking films were perforated in a checkerboard pattern, and the inlet-side end surface 12a was immersed in a plug-forming material slurry in a vessel to cause the plug-forming material slurry to enter into the flow paths through the apertures of the masking film, thereby forming inlet-side plugs 22. The plugs 22 were as long as 8 mm from the end surface 12a of the honeycomb structure 12. With the thickness of the masking film adjusted, 0.5-mm-high protruding portions were formed on the plugs 22. Also, the outlet-side end surface 12b was immersed in the plug-forming material slurry to form outlet-side plugs 23. The outlet-side plugs 23 were as long as 12 mm from the end surface 12b.

(e) Integral Bonding

After positioning the honeycomb structures 11, 12 to be bonded such that their flow paths were aligned, using positioning marks obtained at the time of cutting and positioning bamboo pins inserted into several flow paths of the honeycomb structures 11, 12, the plugs 21 with protruding portions 24 of the honeycomb structure 11 and the plugs 22 of the honeycomb structure 12 were abutted and press-bonded to integrally bond the plugs 21 and 22. Because the plugs were unsintered ones, the plugs 21, 22 of a cordierite-forming material were easily integrated by abutting. Sintering at 1400° C. integrated the honeycomb structures 11 and 12 with their plugs bonded to each other and to cell walls by a cordierite-sintering reaction. The positioning bamboo pins were burned off at the time of sintering.

(f) Formation of Outer Wall

An outer wall was formed by filling peripheral U-grooves of the ceramic honeycomb filter with a paste comprising cordierite particles having an average particle size of 20 μm and colloidal silica, to obtain a ceramic honeycomb filter having an outer diameter of 267 mm.

As described above, two honeycomb structures 11, 12 were bonded in the direction of the flow paths to provide a honeycomb filter having an outer diameter of 267 mm, a length of 304.3 mm, a cell wall thickness of 0.3 mm, and a cell wall pitch of 1.5 mm, with plugs on an exhaust gas-introducing side disposed inside the exhaust gas inlet end, and with space provided upstream of the plugs. With the length of the honeycomb structures 11, 12 adjusted, the length of the plugs 21, 22 and their positions from the exhaust gas-introducing end can be precisely controlled. Also, a common outer wall can be formed on the honeycomb structures 11, 12 to provide a ceramic honeycomb filter with excellent bonding strength. Further, because the cell walls have a surface roughness of 45 μm and are inclined to the outer wall, the ceramic honeycomb filter can capture particulates particularly in flow paths downstream of the plugs on the exhaust gas inlet-side substantially uniformly in its longitudinal direction. Accordingly, it is possible to prevent the filter from being melted and damaged during its regeneration by the self-heat generation of particulates accumulated at high densities upstream of the plugs on the exhaust gas outlet-side.

COMPARATIVE EXAMPLE 1

A ceramic material with moldable consistency was produced by adding methylcellulose, graphite and an organic foaming agent to the same cordierite-forming material powder as in Example 1, sufficiently dry-mixing them, adding water thereto, and further sufficiently blending them. This ceramic material was extrusion-molded to produce a green honeycomb body having large numbers of flow paths partitioned by cell walls inside a peripheral wall integral with the cell walls. This green honeycomb body was then heat-dried in a microwave-drying furnace, and sintered at a maximum temperature of 1410° C. for about 8 days. The resultant honeycomb structure had an outer diameter of 267 mm, a length of 304.8 mm, a wall thickness of 0.3 mm, a pitch of 1.52 mm, a cell wall porosity of 65%, and an average pore size of 22 μm.

As shown in FIG. 6(a), after charging wax 61 into flow paths needing no plugs, an inlet end surface 41a of the honeycomb structure 41 was immersed in a plug-forming slurry 60 to charge the slurry 60 into the flow paths 47a free from wax. The charged slurry was as high as 105 mm. Because water was absorbed into the cell walls in both upper and lower portions of the slurry, solidification occurred in the upper and lower portions of the slurry simultaneously, so that plugs were formed up to the ends of the flow paths as shown in FIG. 6(c). On the other end surface, plugs were formed in every other flow path up to 10 mm from the end surface by the method shown in FIGS. 10(a) to 10(e).

The honeycomb structure sealed by plugs was sintered at 1400° C., so that the plugs were integrally bonded to the cell walls by a cordierite-sintering reaction. The resultant ceramic honeycomb filter of Comparative Example 1 had no space upstream of the plugs.

EFFECT OF THE INVENTION

According to the present invention, space is surely provided upstream of plugs even in a ceramic honeycomb filter having exhaust gas inlet-side plugs inside an exhaust gas inlet end, particularly 10 mm or more inside the exhaust gas inlet end. Accordingly, regeneration is efficiently carried out in the entire honeycomb filter, avoiding the problem that the remaining unburned particulates increase the pressure loss of the honeycomb filter.

What is claimed is:

1. A ceramic honeycomb filter having porous cell walls comprising a first and a second ceramic honeycomb structure, each having large numbers of flow paths partitioned by cell walls, which are bonded in the direction of said flow paths, predetermined flow paths being sealed by plugs, plugs formed at the downstream end of said first ceramic honeycomb structure positioned on an upstream side of an exhaust gas path being bonded to at least part of plugs formed at the upstream end of said second honeycomb structure adjacent to said end of said first honeycomb structure, and a cell wall thickness and a cell wall pitch of said first honeycomb structure being same with those of said second honeycomb structure, respectively.

2. The ceramic honeycomb filter according to claim 1, wherein the first ceramic honeycomb structure with predetermined flow paths sealed by plugs at one end is bonded to the second ceramic honeycomb structure with predetermined flow paths sealed by plugs at both ends, such that said first ceramic honeycomb structure is on an upstream side of said second honeycomb structure.

3. The ceramic honeycomb filter according to claim 1, wherein a ratio A/B of the length A of the plugs at one end of one honeycomb structure to the length B of the plugs at one end of the other honeycomb structure is 1/9-9/1 in the bonded plugs.

4. The ceramic honeycomb filter according to claim 1, wherein the first and second ceramic honeycomb structures are provided with an integral outer wall.

5. The ceramic honeycomb filter according to claim 1, wherein a catalyst is supported by said cell walls and/or at least part of said plugs.

6. A method for producing a ceramic honeycomb filter with predetermined flow paths sealed by plugs, wherein in the bonding of a first and second ceramic honeycomb structure each having large numbers of flow paths partitioned by cell walls in the direction of said flow paths, plugs formed at a downstream end of said first ceramic honeycomb structure positioned on an upstream side of an exhaust gas path are bonded to at least part of plugs formed at an upstream end of said second honeycomb structure adjacent to said first honeycomb structure.

7. The method for producing a ceramic honeycomb filter according to claim 6, comprising cutting one monolithic ceramic honeycomb structure substantially perpendicularly to said flow paths to form a first and second ceramic honeycomb structures, said first and second ceramic honeycomb structure being abutted to each other at cut ends, so that they are bonded to each other via plugs formed at the cut ends in the direction of the flow paths.

8. The method for producing a ceramic honeycomb filter according to claim 6, wherein at least part of plugs formed at the upstream end of said second ceramic honeycomb structure have protruding portions.

* * * * *